Nov. 5, 1968 C. KOSEL 3,409,619
PROCESS FOR SOLIDIFYING CYANURIC CHLORIDE BY CONTACT
WITH VAPORIZING METHYLENE CHLORIDE
Filed Aug. 22, 1966 2 Sheets-Sheet 1

Fig. 1.

INVENTORS
CHRISTIAN KOSEL,
THEODOR LÜSSLING,
BY HERMANN SCHULZ,

Bailey, Stephens & Huettig
ATTORNEYS

United States Patent Office 3,409,619
Patented Nov. 5, 1968

3,409,619
PROCESS FOR SOLIDIFYING CYANURIC CHLORIDE BY CONTACT WITH VAPORIZING METHYLENE CHLORIDE
Christian Kosel, Grossauheim, Theodor Lussling, Hanau am Main, and Hermann Schulz, Frankfurt am Main, Germany, assignors to Deutsche Gold- und Silber-Scheideanstalt vormals Roessler, Frankfurt am Main, Germany
Filed Aug. 22, 1966, Ser. No. 574,064
Claims priority, application Germany, Aug. 21, 1965, D 48,028
14 Claims. (Cl. 260—248)

ABSTRACT OF THE DISCLOSURE

Solid cyanuric chloride is formed from a gas phase by introducing a stream of the gas phase in enveloping relationship with a liquid methylene chloride and an inert gas phase medium. The methylene chloride vaporizes to form fine solid cyanuric chloride particles which are then separated from the gas phase.

---

Figure 2:
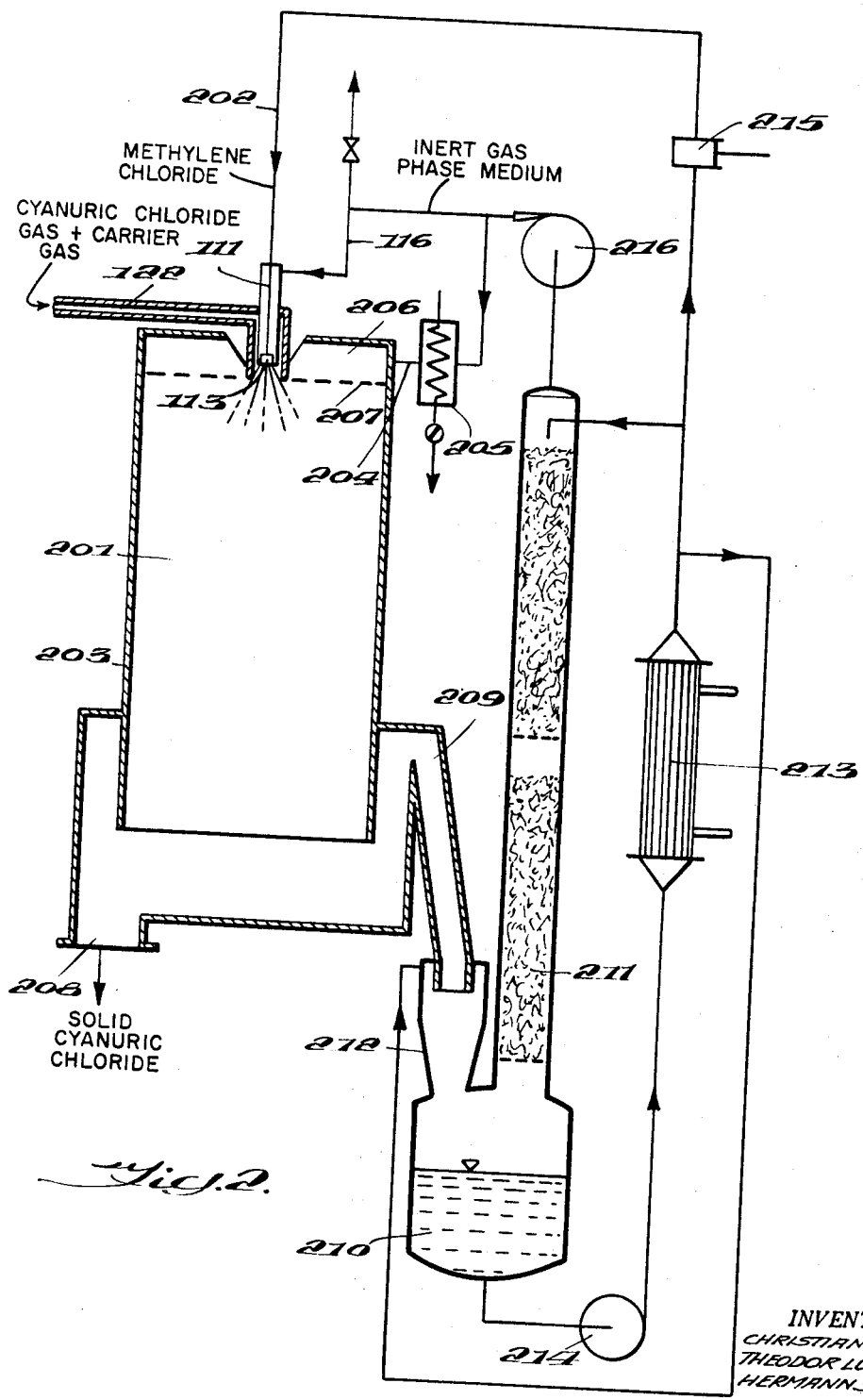

The present invention relates to an improved process for separating finely divided cyanuric chloride from the gas phase by introducing cyanuric chloride vapor into a separating chamber together with a cooling liquid which vaporizes during the separating procedure and is inert with respect to the cyanuric chloride.

It is known that cyanuric chloride can be separated in solid form from vapors thereof by desublimation in externally cooled chambers without passing through the liquid phase. Such process has a number of disadvantages which reside in that it is not possible to prevent with any degree of certainty the deposit of coarse grained cyanuric chloride crystals upon the interior walls of such chambers and any installations contained therein. In addition, the removal of such coarse grained deposits involve considerable trouble in view of the unpleasant physiological properties of cyanuric chloride.

In order to avoid these disadvantages it has been proposed in German Patent 1,071,709 that the cyanuric chloride be vaporized with the aid of a carrier gas and again to separate off the cyanuric chloride in solid form using the desublimation technique with the aid of a cold stream of inert gas. However, this process is also accompanied by considerable disadvantages so that use thereof on a commercial scale is only possible with difficulty. For example, 10,000 m.³ of cold gas are required for separating off each 100 kg. of solid cyanuric chloride. This requires use of large heat exchangers. In addition, despite the use of cyclones connected in series, it has not always been possible to avoid clogging of the conduits which renders such process prone to disturbances. The resulting high energy, maintenance and repair costs unfavorably influence the economy of such process.

A process for the purification of cyanuric chloride is described in German Patent 1,144,283 in which inert vaporized or atomized liquid cooling mediums, which preferably have a boiling point below 20° C., if necessary, under pressure, are employed instead of large quantities of gases. According to the drawing illustrating such process the cooling medium is introduced into the separating chamber through pipes in its cover. It, however, is not revealed what special embodiment is necessary in order to attain the desired effect of separation of the cyanuric chloride in finely divided form. It is only indicated that a special advantage of using easily vaporized liquids as cooling mediums practically avoid deposit of any crusts on the walls of the apparatus. Liquid carbon dioxide, as well as low boiling hydrocarbons, halohydrocarbons and dimethyl ether which are gaseous at room temperature have been especially named as illustrative of such easily vaporizable liquids.

In such process also the handling of the easily vaporizable cooling medium in gas form requires apparatus of large volume if costly provisions for carrying out the process under superatmospheric pressure are not made. In addition, when cooling gases or easily vaporized liquids are employed, physiologically hazardous mixtures of cyanuric chloride with such gases are obtained and must be processed not only to prevent loss of cyanuric chloride but also contamination of the atmosphere.

It was found that the known procedures could not be employed with cooling mediums which are liquid at room temperature and therefore boil at temperatures above about +20° C. at normal pressure. In the tests made considerable encrustations, that is, extensive coarse crystalline deposits, which are particularly to be avoided according to the invention, occurred.

According to the invention it was found that one can obtain a finely divided product devoid of coarse crystalline portions and crusts in the separation of solid cyanuric chloride from the gas phase by introduction of its vapor into a separating chamber together with an inert cooling liquid, especially one which is still liquid at 20° C. at normal pressure, if an inert gaseous or vaporized medium is supplied to the separating chamber to the surface of contact between the vaporized cyanuric chloride and the cooling medium while it first is still liquid. As the introduction of the liquid cooling liquid into the cyanuric chloride vapor advantageously is effected by a nozzle, according to a preferred embodiment of the invention a stream of the gaseous or vaporized medium is supplied to the tip of the liquid cone formed by the injection of the cooling liquid into the surrounding cyanuric chloride vapor. In practical operation of the process, the separating gaseous or vaporized medium is expediently supplied to the head of a nozzle for supply of the liquid cooling medium through an annular space between the supply line for said nozzle and a surrounding concentric jacket and escapes through an annular slit at the head of such nozzle. The end of the jacket adjacent to the nozzle head is heated to prevent deposit of condensed cyanuric chloride on the nozzle head and the outlet parts adjacent thereto.

If, according to a further advantageous embodiment of the invention, at least the rim of the nozzle is held above the boiling point of a separating vaporized liquid medium, such vaporized separating medium can be obtained by vaporizing a liquid which is passed along the outside of the nozzle forming the outlet opening for the cooling medium. For this purpose it is expedient to use the cooling liquid as the medium to be vaporized.

All available organic solvents or solvent mixtures which are inert with respect to cyanuric chloride, preferably those boiling between 30 and 100° C. and in which cyanuric chloride dissolves can be used as cooling liquids. Aliphatic chlorinated hydrocarbons and especially methylene chloride have been found advantageous.

It is expedient to use nitrogen or air or respectively chlorine or cyanogen chloride which in some instances may be contained in the cyanuric chloride vapors as the gaseous medium, which can be employed as such or in admixture with the vaporized medium.

The temperature of the gaseous or vaporized medium respectively should be high enough that no partial condensation can take place. Preferably a temperature between 30° and 50° C. is employed. The quantity of the gaseous or vaporized medium which for example is needed for 1 kg. cyanuric chloride vapor is about 0.1 Nm.³.

In the accompanying drawings:

FIG. 1 diagrammatically shows a nozzle structure suitable for the process according to the invention; and FIG. 2 diagrammatically shows a complete apparatus suitable for carrying out the process according to the invention.

In the structure shown in FIG. 1, a centrally situated supply tube 111, which, if necessary, can be provided with heat insulation 112, is provided for the cooling liquid. Nozzle 113 is located at the end of tube 111. Such supply tube is surrounded by a tube 114 which serves to supply the separating gaseous or vaporized medium. The lower end of tube 114 adjacent to nozzle 113 is provided with a conically shaped outlet opening. The lower end of tube 114 is also provided with a heatable annular space 115. The gas or vapor stream is supplied to tube 114 over supply tube 116 and enters the separating chamber through the annular slit 117 between the nozzle and the lower heated end of tube 114. The arrangement described above is surrounded by a double walled tube 118 which serves to supply the cyanuric chloride vapor to the separating chamber. The jacketed space 119 of said double walled tube 118 can be provided with a heating liquid with the aid of supply and outlet conduits 120 and 121. The conduit 122 for supply of the cyanuric chloride vapor is arranged in the heating liquid outlet conduit 121. Conduits 123 and 124 are provided to supply heating liquid to annular chamber 115.

In practical practice of the invention it is necessary that the temperature of the separating chamber is maintained above the boiling point of the cooling liquid employed. This is most advantageously achieved by appropriate dosing of the cyanuric chloride vapor, cooling liquid and the gaseous or vaporized separating medium. It also is possible to adjust the temperature within the separating chamber to that desired either entirely or additionally by heating the walls of such chamber. This simultaneously prevents an undesired cooling down of the outer wall of the separating chamber as well as the outlets which could lead to the coarse crystalline deposits on the inner side of the walls of the chamber. Advantageously the temperature of the walls of the separating chamber is maintained a little above that of the contents of such chamber.

As an additional measure to hinder undesired coarse crystalline deposits of cyanuric chloride, particularly in the upper portion of the separating chamber, it is possible to supply a gas stream, expediently preheated to the temperature of the gases within the chamber, or a stream of vaporized cooling liquid to the upper end of the separating chamber and pass it through such chamber in the same direction of the stream of cyanuric chloride which is being desublimed by the evaporating cooling liquid at such a low velocity that turbulence is avoided.

According to a very advantageous embodiment of the process according to the invention, the cooling liquid vapors leaving the separating chamber which are saturated with cyanuric chloride are liquified and the resulting dilute solution of cyanuric chloride in the cooling liquid is again introduced into the separating vessel. Expediently the vapors charged with cyanuric chloride vapor which are produced in the separating chamber are condensed by heat exchange with the cold cooling liquid in a wash column and the condensate used for introduction of the cooling liquid into the separating vessel.

Referring both to FIGS. 1 and 2, cyanuric chloride vapor produced in any desired sublimation apparatus, for example, together with air or nitrogen as carrier gas or directly from a cyanuric chloride synthesis furnace together with small quantities of chlorine and/or cyanogen chloride is supplied to separating chamber 201 over supply conduit 122 at a temperature of about 200–250° C. At the same time, the cooling liquid is supplied to nozzle 113 over conduits 202 and 111 and the separating gaseous or vaporized medium is supplied to annular slit 117 over conduit 116. The temperature in separating chamber 201 is maintained over the boiling point of the cooling liquid by appropriate dosage of the cyanuric chloride vapor, the cooling liquid and the separating gaseous or vaporized medium. The entire separating chamber is surrounded by heating jacket 203 through which a heating liquid flows in order to maintain the walls thereof at the temperature prevailing within the separating chamber or preferably a higher temperature. In order that the desubliming cyanuric chloride be given a guided direction in the separating chamber a branched off stream of the gaseous or vaporized medium is, after preheating in heater 205, introduced by conduit 204 into the upper part 206 of the separating chamber through sieve plate 207 at a low velocity. The cyanuric chloride is obtained in very finely divided form at the bottom of the separating chamber from which it can be removed with a suitable discharge mechanism (not shown) through discharge opening 208. The vapor of the cooling liquid, which is saturated with cyanuric chloride corresponding to the partial pressure of the latter, is withdrawn through discharge conduit 209 and introduced into the sump 210 of wash column 211. According to a preferred embodiment of the invention, the interior of the transition tube 212 is rinsed with cooling liquid in the cooling zone between separating chamber 201 and the wash column sump 210. The vapors of the cooling liquid are cooled off further in the wash column 211 and partially liquified therein. According to the invention cooling liquid which has been cooled down in heat exchanger 213 is supplied to the head of wash column 211 and passed countercurrently to the vapors of the cooling liquid. The liquified cooling liquid is recycled with the aid of a small piston pump 215 from the sump 210 of the wash column to nozzle 113. A small blower 216 is provided at the head of the wash column which serves to supply the separating gaseous medium and/or vaporized cooling liquid which is free of cyanuric chloride to annular slit 117 and to the upper part of column 201 through sieve plate 207.

The process according to the invention provides considerable technical and economical advantages over the prior art processes described above. The handling of liquids through simple conduits with the aid of liquid pumps is technically uncomplicated and the energy costs are so low that they practically are of no importance. In addition, with the process according to the invention, mixtures of the physiologically objectionable cyanuric chloride vapors with gases do not escape at any point, the elimination of which, to prevent air contamination and troubles in operation, is necessary and expensive. In contrast, no special separating means such as filter sacks, cyclones, and the like which require constant supervision and cleaning and which are required when handling adjuvant materials which are gaseous at room temperatures, such as permanent gases and liquified gases, are necessary. It is especially to be emphasized that the cooling liquid employed according to the invention is of especial economical advantage as it can be recycled after condensation with small sized heat exchangers operated with water without necessitating special costs, such as, for example, for compressors or intense cooling. Interruptions in operation are very seldom as no deposits of solids are to be feared in any location. The process furthermore can be carried out with a minimum of personnel as the automization of such a fully continuously operating plant is very easy to achieve.

The following examples will serve to illustrate the invention:

Example 1

19.4 kg./h. of cyanuric chloride vapor and 150 N liters/h. of nitrogen, as carrier gas, were introduced at 200° C. into the upper portion of cylindrical separating chamber 201 of a diameter of 0.8 m. and a height of 1.8 m. At the same time 33.2 kg./h. of methylene chloride are introduced into the cyanuric chloride stream through conduits 202 and 111 and nozzle 113. The annular space 115 at the bottom of tube 114 is heated to about 220° C. with the aid of circulating oil. 2 Nm.$^3$/h. of a vapor-gas mixture of about 80 vol. percent methylene chloride vapor and about 20 vol. percent of nitrogen are blown in through annular slit 117 over conduit 116 with the aid of blower 216. In addition, 10 Nm.$^3$/h. of the same vapor-gas mixture are blown into the top of separating chamber 201 via heater 205, conduit 204, distributing chamber 206 and sieve plate 207.

Under these circumstances the temperature of the mixture in separating chamber 201 adjusted itself to about 55–60° C. Depending upon the requirements heating jacket 203 was maintained at a temperature of 65 to 70° C. with the aid of recycling warm water. Fine crystalline cyanuric chloride with a grain size distribution between 10 and 70μ settled down in the bottom of separating chamber 201. The vaporized methylene chloride which was saturated with cyanuric chloride vapor was removed from the bottom of separating chamber 201 through discharge conduit 209 which was still heated to prevent deposits and supplied to the wash column 211 over transition tube 212, the inner wall of which was rinsed tangentially by pumping in methylene chloride. The wash column which was 2 m. high and 150 mm. in diameter filled with saddles was washed with 400 l./h. of methylene chloride which had been cooled down in cooler 213. The 12 Nm.$^3$/h. of gas-vapor mixture required for the supply of annular slit 117 and distributing chamber 206 were supplied with the aid of the small blower 216. The 33.2 kg./h. of liquid methylene chloride which were supplied to nozzle 113 were taken from the liquid methylene chloride being recycled through the wash column system and supplied to such nozzle with the aid of pump 215.

Example 2

The procedure of Example 1 was repeated except that the methylene chloride was replaced by chloroform. 42 kg./h. of chloroform were required to separate out 19.4 kg./h. of cyanuric chloride. The temperature in the separating chamber was 80° C. and the wall temperature was 85–90° C.

We claim:

1. In a process for separating finely divided solid cyanuric chloride from gas phase cyanuric chloride by simultaneous introduction into a separating chamber of cyanuric chloride vapor and a cooling liquid which is inert with respect to cyanuric chloride and is vaporized during separation of the solid cyanuric chloride in said chamber the steps of introducing a stream of the cooling liquid into the chamber through an innermost path, enveloping said cooling liquid with an inert gas phase medium at the point of its introduction into the chamber and introducing the vapor phase cyanuric chloride exteriorly of the cooling liquid stream enveloped by the inert gas phase medium and in concurrent flow relationship therewith to surround the inert gas phase medium and cooling liquid stream.

2. The process of claim 1 wherein the vapor phase cyanuric chloride is introduced as an annular stream to surround the inert gas phase medium and cooling liquid stream.

3. The process of claim 2 in which said gas phase medium is the cooling liquid in vaporized form.

4. The process of claim 2 in which the cooling liquid is a liquid in which cyanuric chloride is soluble.

5. The process of claim 4 in which the cooling liquid is an aliphatic chlorinated hydrocarbon having a boiling point between about 30° C. and 100° C.

6. The process of claim 5 in which said cooling liquid is methylene chloride.

7. The process of claim 4 in which the cooling liquid vapors are removed from the separating chamber then condensed and the resulting solution of cyanuric chloride in the condensed cooling liquid is recycled to the separating chamber.

8. The process of claim 7 in which the condensation of the cooling liquid vapors is effected by heat exchange with cold cooling liquid in a washing column.

9. The process of claim 8 in which the cooling liquid vapors leaving the separating chamber are introduced into the washing column through a conduit the interior of which is rinsed with cooling liquid.

10. The process of claim 2 in which the temperature of the interior of the separating chamber is maintained above the boiling point of the cooling liquid.

11. The process of claim 2 in which the walls of the separating chamber are maintained at a temperature at least as high as that of the gases in said separating chamber.

12. The process of claim 2 comprising in addition passing an inert gas phase medium through the separating chamber concurrently with said vaporizing cooling liquid and said solidifying cyanuric chloride at a velocity sufficiently low to avoid turbulence.

13. The process of claim 2 in which said cooling liquid is introduced into the separating chamber through a nozzle forming a conical liquid stream of said cooling liquid and the inert gas phase medium is supplied to the tip of said conical stream of cooling liquid so as to envelope it.

14. The process of claim 13 in which the gas phase medium is supplied to the tip of said conical stream of cooling liquid through a jacket ending at an annular slit adjacent to and concentric with said nozzle, said slit being formed between said nozzle and the jacket, the end of said jacket adjacent said nozzle being heated.

References Cited

UNITED STATES PATENTS

| | | | |
|---|---|---|---|
| 2,732,257 | 1/1956 | Cress | 239—132.3 X |
| 3,011,864 | 12/1961 | Morse et al. | 23—359 |
| 3,179,662 | 4/1965 | Zinsstag et al. | 260—248 |
| 3,212,559 | 10/1965 | Williamson | 159—4 |

FOREIGN PATENTS

| | | |
|---|---|---|
| 467,623 | 8/1950 | Canada. |
| 1,071,709 | 12/1959 | Germany. |

NORMAN YUDKOFF, *Primary Examiner.*

V. W. PRETKA, *Assistant Examiner.*